United States Patent
Chatterjee et al.

(10) Patent No.: US 12,529,650 B2
(45) Date of Patent: Jan. 20, 2026

(54) METHODS AND SYSTEMS FOR MONITORING LUBRICANT OIL CONDITION USING PHOTOACOUSTIC MODELLING

(71) Applicant: Tata Consultancy Services Limited, Mumbai (IN)

(72) Inventors: Subhasri Chatterjee, Kolkata (IN); Abhijit Gorey, Kolkata (IN); Arijit Sinharay, Kolkata (IN); Chirabrata Bhaumik, Kolkata (IN); Tapas Chakravarty, Kolkata (IN); Supriya Gain, Kolkata (IN); Arpan Pal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 257 days.

(21) Appl. No.: 18/355,266

(22) Filed: Jul. 19, 2023

(65) Prior Publication Data
US 2024/0068934 A1 Feb. 29, 2024

(30) Foreign Application Priority Data
Aug. 12, 2022 (IN) .............. 202221046212

(51) Int. Cl.
*G01N 21/17* (2006.01)
*G01N 33/28* (2006.01)

(52) U.S. Cl.
CPC ..... *G01N 21/1702* (2013.01); *G01N 33/2888* (2013.01); *G01N 2201/06113* (2013.01)

(58) Field of Classification Search
None
See application file for complete search history.

(56) References Cited

U.S. PATENT DOCUMENTS 10,809,164 B2 10/2020 Young et al.
11,513,111 B2 * 11/2022 Patel ............... G01N 33/2835
(Continued)

FOREIGN PATENT DOCUMENTS

CN 111639763 A 9/2020

OTHER PUBLICATIONS

Zhu, Junda et al., "Survey of lubrication oil condition monitoring, diagnostics, prognostics techniques and systems", Title of the item: Journal of Chemical Science and Technology, Date: 2013, vol. 2, Link: https://www.researchgate.net/publication/273945596_Survey_of_lubrication_oil_condition_monitoring_diagnostics_prognostics_techniques_and_systems.

(Continued)

*Primary Examiner* — Suman K Nath
(74) *Attorney, Agent, or Firm* — Finnegan, Henderson, Farabow, Garrett & Dunner, LLP

(57) ABSTRACT

The disclosure relates generally to methods and systems for monitoring lubricant oil condition using a photoacoustic modelling. Conventional techniques in the art for checking the condition of the lubricant oil is laboratory based and thus time consuming, error prone and not efficient. The present disclosure discloses a photoacoustic simulation model which is developed utilizing a photonic model such as a Monte Carlo method-based optical simulation integrated with a finite element model such as a k-wave toolbox-based acoustic measurement. The photoacoustic simulation model of the present disclosure is used to obtain a photoacoustic signal of the lubricant oil sample and a set of statistical features are determined from the obtained photoacoustic signal. The determined set of statistical features are then used as a training data to develop a machine learning (ML) model which is used to classify a type of contamination of the test lubricating oil.

9 Claims, 6 Drawing Sheets

(56) References Cited

U.S. PATENT DOCUMENTS

| | | | |
|---|---|---|---|
| 11,640,525 B2 * | 5/2023 | Misra ................... | G06F 16/285 |
| | | | 706/20 |
| 2022/0120727 A1 * | 4/2022 | Al-Dabbagh ......... | G06F 16/285 |

OTHER PUBLICATIONS

Tonghai, Wu et al., "Progress and trend of sensor technology for on-line oil monitoring", Title of the item: Science China Technological Sciences, Date: 2013, Publisher: Springer, Link: https://www.researchgate.net/profile/Zhongxiao-Peng/publication/271407333_Progress_and_trend_of_sensor_technology_for_onlin_oil_monitoring/links/5813c06908aeffbed6bc26a2/Progress-and-trend-of-sensor-technology-for-on-line-oil-monitoring.pdf.

* cited by examiner

METHODS AND SYSTEMS FOR MONITORING LUBRICANT OIL CONDITION USING PHOTOACOUSTIC MODELLING

PRIORITY CLAIM

This U.S. patent application claims priority under 35 U.S.C. § 119 to: Indian Patent Application No. 202221046212, filed on Aug. 12, 2022. The entire contents of the aforementioned application are incorporated herein by reference.

TECHNICAL FIELD

The disclosure herein generally relates to the field of lubricant oil condition analysis, and more specifically to methods and systems for monitoring lubricant oil condition using a photoacoustic modelling.

BACKGROUND

Analysis of lubricating oil is an effective approach in investigating the condition of a machine and providing an early warning of any failure in the performance and progression of the machine. Several sensing mechanisms are explored to depict different thermal, physical, and inherent properties of the lubricating oil for machine health monitoring. However, the standard industrial procedure for the oil inspection is time consuming and laborious.

Out of the different properties of the lubricating oil, one of the key thermophysical properties is a viscosity that changes with different parameters such as water ingress, soot particle contamination etc., occurring due to different faults of the machine. Conventional techniques in the art to measure the viscosity are usually laborious (i.e., taking the sample for chemical analysis, etc.), time-consuming and involve complex post-processing of data. A convenient approach to investigate the causality of machine faults and determine the viscosity of lubrication oil would need a multiparametric sophisticated robust measurement system. However, it is technically challenging to execute experiments in the lab with an industry-standard oil having variable contaminants. Hence the conventional solutions in the art for checking the condition of the lubricant oil is time consuming, error prone and not efficient.

SUMMARY

Embodiments of the present disclosure present technological improvements as solutions to one or more of the above-mentioned technical problems recognized by the inventors in conventional systems.

In an aspect, a processor-implemented method for monitoring lubricant oil condition using a photoacoustic modelling is provided. The method including the steps of: receiving a plurality of lubricant oil samples, and a classification label for each of the plurality of lubricant oil samples; simulating each lubricant oil sample, to obtain a plurality of simulated photoacoustic signals from the plurality of lubricant oil samples, using a photoacoustic simulation model; determining one or more statistical features, for each lubricant oil sample, from the corresponding simulated photoacoustic signal, using a signal processing technique; training a machine learning (ML) model with (i) the one or more statistical features for each lubricant oil sample of the plurality of lubricant oil samples and (ii) the classification label for each of the plurality of lubricant oil samples, to obtain a trained ML model; receiving a test lubricant oil sample for which the lubricant oil condition to be monitored; determining a test photoacoustic signal from the test lubricant oil sample, using an experimental model; determining the one or more statistical features of the test lubricant oil sample, from the test photoacoustic signal, using the signal processing technique; and passing the one or more statistical features of the test lubricant oil sample, to the trained ML model, to obtain the classification label for the lubricant oil sample, wherein the classification label provides the lubricant oil condition of the test lubricant oil sample.

In another aspect, a system for monitoring a lubricant oil condition using a photoacoustic simulation model is provided. The system includes: a memory storing instructions; one or more Input/Output (I/O) interfaces; and one or more hardware processors coupled to the memory via the one or more I/O interfaces, wherein the one or more hardware processors are configured by the instructions to: receive a plurality of lubricant oil samples, and a classification label for each of the plurality of lubricant oil samples; simulate each lubricant oil sample, to obtain a plurality of simulated photoacoustic signals from the plurality of lubricant oil samples, using a photoacoustic simulation model; determine one or more statistical features, for each lubricant oil sample, from the corresponding simulated photoacoustic signal, using a signal processing technique; train a machine learning (ML) model with (i) the one or more statistical features for each lubricant oil sample of the plurality of lubricant oil samples and (ii) the classification label for each of the plurality of lubricant oil samples, to obtain a trained ML model; receive a test lubricant oil sample for which the lubricant oil condition to be monitored; determine a test photoacoustic signal from the test lubricant oil sample, using an experimental model; determine the one or more statistical features of the test lubricant oil sample, from the test photoacoustic signal, using the signal processing technique; and pass the one or more statistical features of the test lubricant oil sample, to the trained ML model, to obtain the classification label for the lubricant oil sample, wherein the classification label provides the lubricant oil condition of the test lubricant oil sample.

In yet another aspect, there are provided one or more non-transitory machine-readable information storage mediums comprising one or more instructions which when executed by one or more hardware processors cause: receiving a plurality of lubricant oil samples, and a classification label for each of the plurality of lubricant oil samples; simulating each lubricant oil sample, to obtain a plurality of simulated photoacoustic signals from the plurality of lubricant oil samples, using a photoacoustic simulation model; determining one or more statistical features, for each lubricant oil sample, from the corresponding simulated photoacoustic signal, using a signal processing technique; training a machine learning (ML) model with (i) the one or more statistical features for each lubricant oil sample of the plurality of lubricant oil samples and (ii) the classification label for each of the plurality of lubricant oil samples, to obtain a trained ML model; receiving a test lubricant oil sample for which the lubricant oil condition to be monitored; determining a test photoacoustic signal from the test lubricant oil sample, using an experimental model; determining the one or more statistical features of the test lubricant oil sample, from the test photoacoustic signal, using the signal processing technique; and passing the one or more statistical features of the test lubricant oil sample, to the trained ML model, to obtain the classification label for the lubricant oil sample, wherein the classification label provides the lubricant oil condition of the test lubricant oil sample.

In an embodiment, determining the test photoacoustic signal from the test lubricant oil sample, using the experimental model, comprising: obtaining a modulated signal for the test lubricant oil sample, using an arbitrary waveform generator; obtaining an intensity modulated laser signal for the test lubricant oil sample, by passing the modulated signal to a continuous wave laser source; obtaining an ultrasound signal for the test lubricant oil sample, by irradiating the intensity modulated laser signal on the test lubricant oil sample using an ultrasound sensor; and obtaining the test photoacoustic signal for the test lubricant oil sample, by correlating the modulated signal and the ultrasound signal.

In an embodiment, simulating each lubricant oil sample to obtain corresponding simulated photoacoustic signal, using the photoacoustic simulation model, comprising: determining one or more optical parameters, a contaminant concentration, a temperature, and one or more acoustic parameters, for the corresponding lubricant oil sample; determining a fluence for the corresponding lubricant oil sample, based on the one or more optical parameters and the contaminant concentration, using a photonic model; generating an initial acoustic pressure signal for the lubricant oil sample, using a finite element technique based on the one or more acoustic parameters, the contaminant concentration, the temperature, and the fluence; propagating the initial acoustic pressure signal to obtain a propagated acoustic pressure signal for the corresponding lubricant oil sample, using the finite element technique; and obtaining the simulated photoacoustic signal for the corresponding lubricant oil sample, by correlating the initial acoustic pressure signal and the propagated acoustic pressure signal.

In an embodiment, the one or more statistical features for each lubricant oil sample, are determined from a time-frequency signal of the corresponding simulated photoacoustic signal.

In an embodiment, the one or more statistical features of the test lubricant oil sample, are determined from a time-frequency signal of the test photoacoustic signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
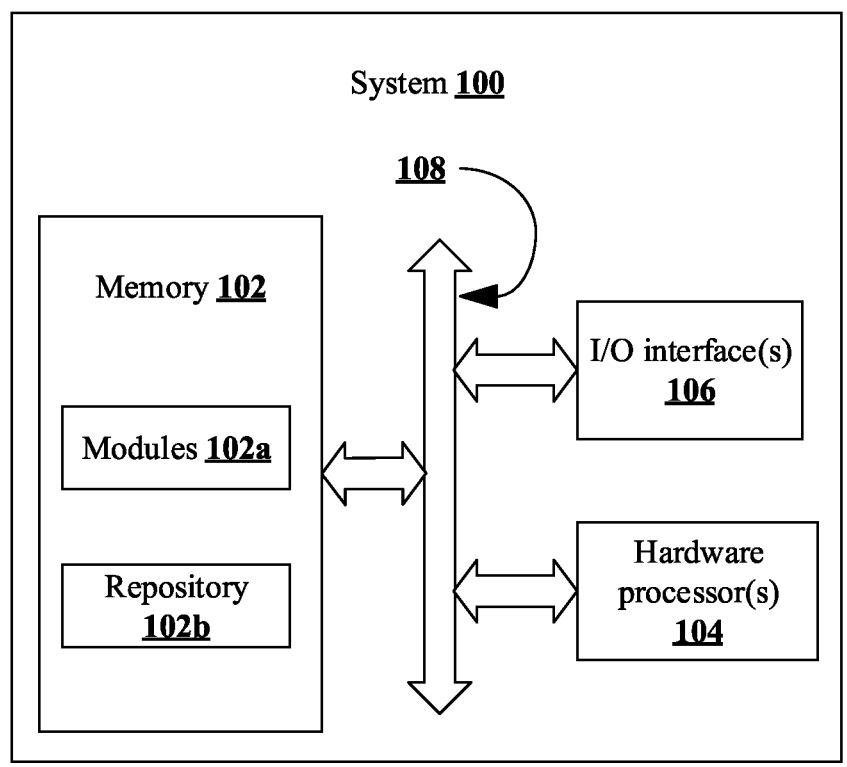
FIG. 1 is an exemplary block diagram of a system for monitoring lubricant oil condition using a photoacoustic modeling, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure solves the technical problems in the art for monitoring lubricant oil condition using a multiparametric and hybrid sensing methods is a photoacoustic sensing which is applied to investigate the viscosity of the lubrication oil and depict the fault of the machine. The photoacoustic sensing is one of the emerging technologies for non-invasive sensing of fluid properties with high sensitivity. The potential of the photoacoustic sensing to probe lubrication oil has not greatly explored by the researchers, probably due to the inconvenience to execute experiments in the lab with an industry-standard oil having variable contaminants. To understand the working principle of the technology and design a multiparametric measurement system for oil quality determination based on photoacoustic sensing, and to overcome the experimental limitations, a model-based investigation is imperative.

Hence the methods and systems of the present invention discloses a photoacoustic simulation model which is a robust in silico model of photoacoustic-oil interaction. In an embodiment, the photoacoustic simulation model of the present disclosure is developed utilizing a photonic model such as a Monte Carlo method-based optical simulation integrated with a finite element model such as a k-wave toolbox-based acoustic measurement. The photoacoustic simulation model of the present disclosure is used to obtain a photoacoustic signal of the lubricant oil sample and a set of statistical features are determined from the obtained photoacoustic signal. The determined set of statistical features are then used as a training data to develop a machine learning (ML) model. Then, the photoacoustic signal of the test lubricant oil sample whose condition to be monitored, is obtained using an experimental model, which is passed to the developed ML model to classify a type of contamination of the test lubricating oil sample.

Referring now to the drawings, and more particularly to FIG. 1 through FIG. 5B, where similar reference characters denote corresponding features consistently throughout the figures, there are shown preferred embodiments and these embodiments are described in the context of the following exemplary systems and/or methods.

FIG. 1 is an exemplary block diagram of a system 100 for monitoring lubricant oil condition using a photoacoustic modelling, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102b is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2A:
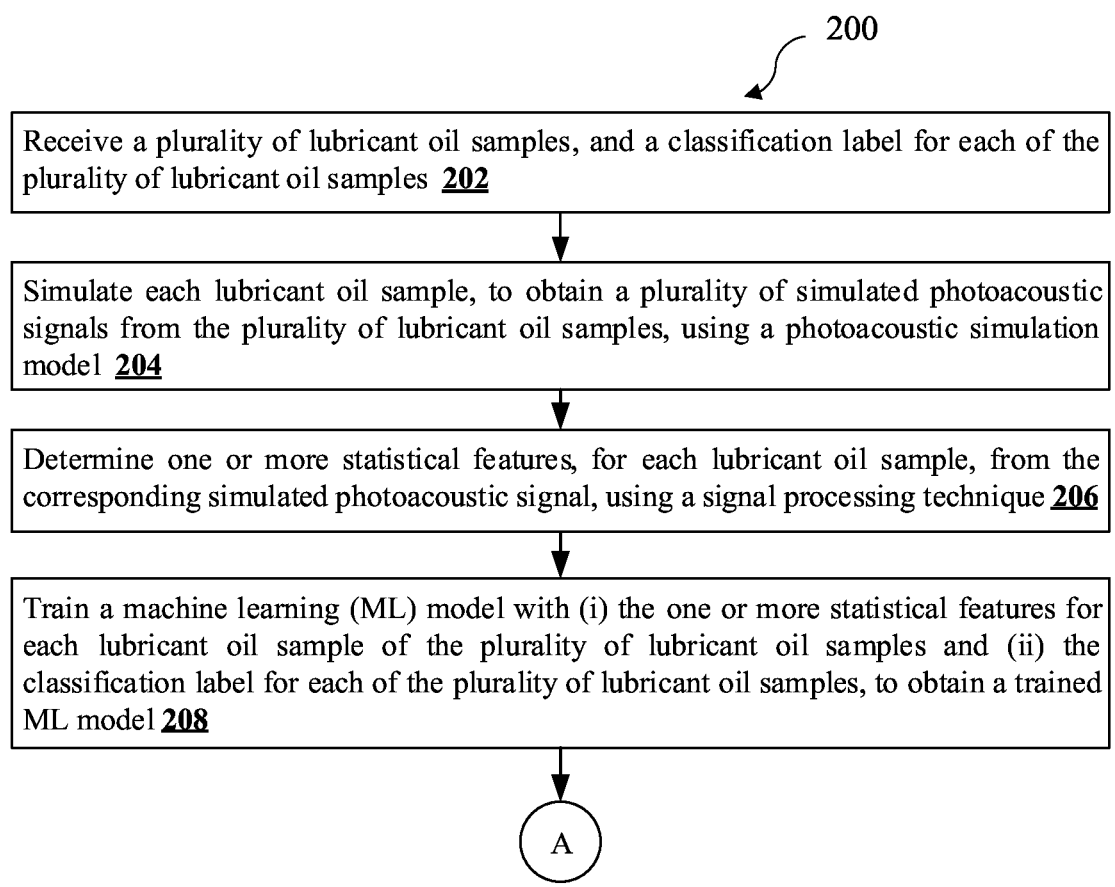
FIGS. 2A and 2B illustrates exemplary flow diagrams of a processor-implemented method for monitoring lubricant oil condition using a photoacoustic modelling, in accordance with some embodiments of the present disclosure.
Figure 2B:
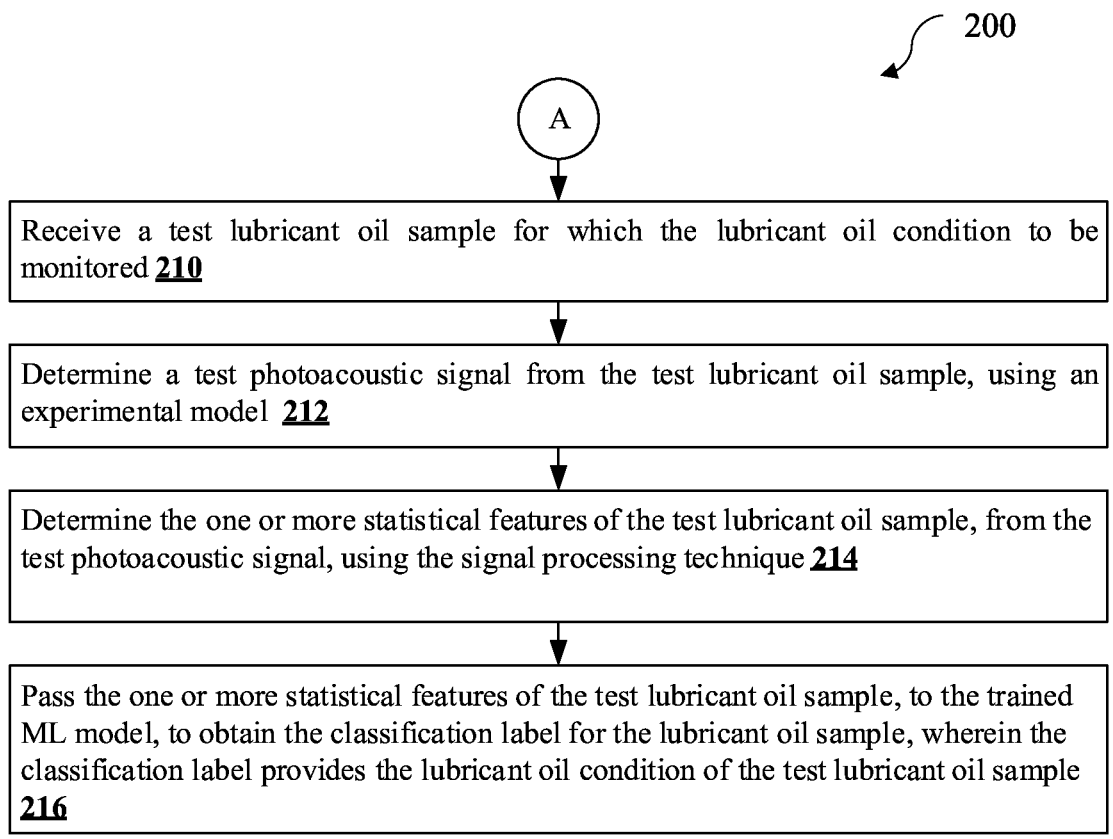

Referring to FIGS. 2A and 2B, components and functionalities of the system 100 are described in accordance with an example embodiment of the present disclosure. For example, FIGS. 2A and 2B illustrates exemplary flow diagrams of a processor-implemented method 200 for monitoring lubricant oil condition using a photoacoustic modelling, in accordance with some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 202 of the method 200, the one or more hardware processors 104 of the system 100 are configured to receive a plurality of lubricant oil samples, and a classification label associated with each lubricant oil sample of the plurality of lubricant oil samples. In an embodiment, the plurality of lubricant oil samples is received in the form of measurement signals which may be obtained when the lubricant oil samples are passes through a measurement sensor.

The plurality of lubricant oil samples includes contaminated lubricant oil samples and non-contaminated lubricant oil samples. The contaminated lubricant oil samples are associated with the used lubricant oils may be obtained from machineries where the lubricant oils were used. In an embodiment, the machineries include but are not limited to industrial machineries, non-industrial machineries, and vehicles.

The classification label associated with each lubricant oil sample, defines the contamination type of the corresponding lubricant oil sample. The contamination type includes a 'contaminated' and a 'non-contaminated' label. Further, the 'contaminated' label further sub-labels, for example, whether contaminated with water ingress, whether contaminated with soot particle, whether contaminated with water ingress and soot particle, and so on. Hence an exemplary classification label list includes: 'non-contaminated', 'contaminated with water ingress', 'contaminated with soot particle', 'contaminated with water ingress and soot particle', 'contaminated with others'.

At step 204 of the method 200, the one or more hardware processors 104 of the system 100 are configured to simulate each lubricant oil sample of the plurality of lubricant oil samples received at step 202 of the method 200, to obtain corresponding simulated photoacoustic signal. A photoacoustic simulation model is used for simulating each lubricant oil sample to obtain the corresponding simulated photoacoustic signal. After the simulation, the plurality of simulated photoacoustic signals is obtained from the plurality of lubricant oil samples.

Figure 3:
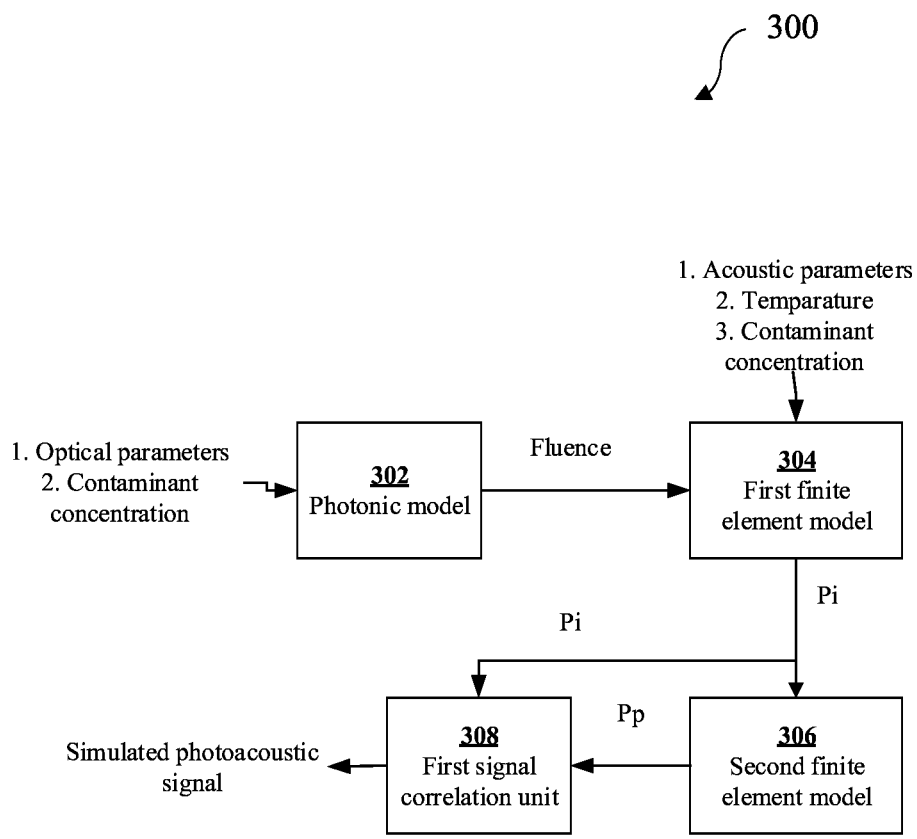
FIG. 3 is an exemplary block diagram of a photoacoustic simulation model, in accordance with some embodiments of the present disclosure.

The photoacoustic simulation model makes use of both optical parameters and the acoustic parameters of the corresponding lubricant oil sample for the simulation to obtain the corresponding simulated photoacoustic signal. FIG. 3 is an exemplary block diagram of the photoacoustic simulation model 300, in accordance with some embodiments of the present disclosure. As shown in FIG. 3, the photoacoustic simulation model 300 includes a photonic model 302, a first finite element model 304, a second finite element model 306, and a first signal correlation unit 308. The first finite element model 304 and the second finite element model 306 are identical to each other. The simulation of each lubricant oil sample to obtain the corresponding simulated photoacoustic signal, using the photoacoustic simulation model 300 is explained in the below steps:

At the first step, one or more optical parameters, a contaminant concentration, a temperature, and one or more acoustic parameters, of the corresponding lubricant oil sample are determined. In an embodiment, the one or more optical parameters of the lubricant oil sample are the optical parameters selected from a list consisting of: an optical absorption coefficient $\mu_a$, a scattering coefficient $\mu_s$ and a scattering anisotropy g. The one or more optical parameters of the lubricant oil sample are determined based on a predefined optical wavelength. In an embodiment, the predefined optical wavelength is 450 nm. Further, a sinusoidal beam of incident from a source with a diameter of 1 mm is considered for determining the one or more optical parameters.

The contaminant concentration of the lubricant oil sample is determined in the form of an effective absorption coefficient $$\left(\mu_{a_{o_{eff}}}\right).$$

For example, if the lubricant oil sample is contaminated with the water, then among the water and the oil, the water greatly affects the absorption of light. Hence the effective absorption coefficient $$\left(\mu_{a_{o_{eff}}}\right)$$

is determined based on an absorption coefficients of water $\mu_{a_w}$ and the absorption coefficients of oil $\mu_{a_o}$ at the wavelength 450 nm, using an equation 1:

$$\mu_{a_{o_{eff}}} = V_w \cdot \mu_{a_w} + (1 - V_w) \cdot \mu_{a_o} \qquad (1)$$

where $V_W$ is a volume fraction of the water contamination within the oil.

Further, at the operating wavelength of 450 nm, the absorption coefficient of the oil $\mu_{a_o}$ is experimentally acquired using spectroscopic measurements in the laboratory, i.e., $\mu_{a_o}$=3.23 mm$^{-1}$. The absorption coefficient of water $\mu_{a_w}$ at this wavelength is adapted from literature, i.e., $\mu_{a_w}$=4× 10$^{-3}$ mm$^{-1}$. The scattering coefficient and the anisotropy factor of the lubricant oil at the operating wavelength are adapted from literature as $\mu_{s_o}$=132.29 mm$^{-1}$ and $g_o$=0.86, respectively. Based on the experimental analysis, the soot particle concentration is varied from 0-8%, and that for water is varied from 0-2%, both with an interval of 0.1%.

The temperature for the corresponding lubricant oil sample is obtained through a temperature measurement sensor.

The one or more acoustic parameters includes a speed of sound, a density of the contaminated oil and a Grüneisen parameter. The speed of sound is considered to be approximately 1500 m/s at a temperature of 30° C. The density of the oil effectively changes with the soot particle. The effective density $d_{o_{eff}}$ is considered as in equation 2:

$$d_{o_{eff}} = d_s + d_o \qquad (2)$$

where $d_s$ is the concentration of the soot particle, and $d_o$ is the density of pure oil $d_o$=0.85 g/cm$^3$.

Another acoustic parameter used is the Grüneisen parameter τ which is a temperature dependent quantity depicting the lattice structure of the oil sample. For lubricant oil, this parameter is considered 0.85 at 30° C. temperature as found in literature.

At the second step, a fluence for the corresponding lubricant oil sample, is determined based on the one or more optical parameters and the contaminant concentration of the corresponding lubricant oil sample received at the first step, using the photonic model 302. The photonic model 302 is any simulation model which is able to determine the fluence using the optical parameters and the contaminant concentration.

In an embodiment, the photonic model 302 is a Monte Carlo simulation model which is a stochastic process to trace photon paths through a medium by random sampling of the probability distribution of the optical interaction properties such as scattering and absorption. The migration of photons from a laser source was simulated through the medium in random step sizes (s) calculated based on the probability distribution of the scattering through the medium as a function of the scattering coefficient $\mu_s$ as shown in the equation 3:

$$s = -\frac{\ln \xi}{\mu_s} \qquad (3)$$

where ξ is a computer generated pseudo-random number lying between 0 to 1, and the probability distribution of scattering (p$_s$) was calculated by the equation 4:

$$p_s = \int_0^x \mu_s e^{-\mu_s x} dx \qquad (4)$$

The scattering angle was calculated based on the Henyey Greenstein phase function, generating the probability p(θ) of the photon being scattered in a direction as a function of the anisotropy factor g, as shown in equation 5:

$$p(\theta) = \frac{1}{4\pi} \frac{1-g^2}{(1+g^2-2g\cos\theta)^{\frac{3}{2}}} \quad (5)$$

The scattering angle $\theta$ was calculated from the probability distribution function as a function of a random number $\xi$ ($0<\xi<1$) so that random scattering angles can be generated, as shown in equation 6:

$$\theta = \cos^{-1}\left[\frac{1}{2g}\left\{1+g^2-\left(\frac{1-g^2}{1-g+2g\xi}\right)^2\right\}\right] \quad (6)$$

Each photon is propagated through the medium based on the simulated step size and the scattering direction.

Then, the fluence F, is the deposited optical energy per unit area within the medium is calculated by the Monte Carlo simulation model. In the simulation, each incident photon is assigned with an initial statistical weight w=1. In each interaction of the photon with the medium, a fraction of this photon weight, $$\left(\Delta w = \frac{\mu_a}{\mu_a+\mu_s}\cdot w\right)$$

is aborbed in the medium, and the photon keeps propagating with the rest of the weight (w←w−Δw). This absorbed quantity depends on the absorption coefficient of the medium. This continues until the photon is detected (by the given sensor specs), and the deposited energy at interaction points sums up to the total energy deposition by the photon. The fluence F through a unit cross-sectional area is calculated by averaging the total deposited energy by all photons.

Let a single photon interacts K times with the medium before being discarded (i.e., photon weight falls below a threshold, in this case, $10^{-6}$). Therefore, the total absorbed energy $W_A$ due to that photon will be calculated from equation 7:

$$W_A = \sum_{i=1}^{K} \Delta w_i \quad (7)$$

Considering N to be the total detected photons, the fluence F is calculated from equation 8:

$$F = \frac{1}{NA}\sum_{j=1}^{N} W_{A_j} \quad (8)$$

where A is the element area (in this case pixel).

At the third step, an initial acoustic pressure signal for the lubricant oil sample, is generated using a finite element technique based on the one or more acoustic parameters, the contaminant concentration, and the temperature determined at the first step and the fluence determined at the second step. The finite element technique is present in the first finite element model 304. In an embodiment, the finite element technique is a technique by the finite element model 304 such as a K-wave toolbox.

The initial acoustic pressure signal $P_i$ is generated using the equation 9:

$$P_i = P_1 \cdot S \quad (9)$$

wherein $P_1$ is an initial acoustic pressure and S is an input chirp signal incident with a frequency sweeping through 0.1-1 MHz, which is used to initialize the K-wave toolbox.

The initial acoustic pressure $P_1$ is calculated based on the fluence F determined at the second step, the Grüneisen parameter $\tau$, the optical absorption coefficient $\mu_a$ of the medium, using the equation 10:

$$P_1 = \mu_a \cdot F \cdot T \quad (10)$$

At the fourth step, the initial acoustic pressure signal $P_i$ of the lubricant oil sample generated at the third step is propagated using the finite element technique, obtain a propagated acoustic pressure signal $P_p$ for the corresponding lubricant oil sample. The finite element technique is present in the second finite element model 306. In an embodiment, the finite element technique is the technique by the finite element model 306 such as the K-wave toolbox. The first finite element model 304 and the finite element model 306 are identical to each other and used twice, i.e., one for generating the initial acoustic pressure signal and the second for the obtaining the propagated acoustic pressure signal from the initial acoustic pressure signal.

Further a medium acoustic absorption coefficient 7.68 dB/MHz$^y$cm and the medium power law absorption exponent 1.1 are used in the K-wave toolbox. With c as the speed of sound, the initial acoustic pressure signal $P_i$ is propagated through the medium using the equation 11:

$$\nabla^2 p - \frac{1}{c^2}\cdot\frac{\partial^2 P_i}{\partial t^2} = 0 \quad (11)$$

The acoustic wave treats the oil as an absorbing medium and propagates the following using a power law defined as in equation 12:

$$\alpha = \alpha_0 \omega^y \quad (12)$$

wherein $\alpha$ and $\alpha_0$ are the acoustic absorption coefficient and a power law pre-factor respectively and y is the power law exponent. The propagated acoustic pressure signal $P_p$ is a time-delayed modulated signal detected by the simulated single sensor point.

At the fifth and final step, the initial acoustic pressure signal $P_i$ generated at the third step and the propagated acoustic pressure signal $P_p$ obtained at the fourth step are correlated, through the first signal correlation unit 308, to obtain the simulated photoacoustic signal $T_s$ for the corresponding lubricant oil sample.

The simulated photoacoustic signal $T_s$ is derived by cross-correlating the initial acoustic pressure signal $P_i$ and the propagated acoustic pressure signal $P_p$. The initial acoustic pressure signal $P_i$ and the propagated acoustic pressure signal $P_p$ (both being functions of time t) are cross-correlated using the equation 13:

$$T_S = (P_i * P_p)(\Delta t) = \int_{-\infty}^{\infty} \overline{P_i(t)}\cdot P_p(t+\Delta t)dt \quad (13)$$

wherein $\Delta t$ is the time delay between two signals and $\overline{P_i(t)}$ is the complex conjugate of $P_i(t)$.

The simulated photoacoustic signal $T_s$ contains both the optical or photo properties and the acoustic properties and thus is used to derive effective features of the corresponding lubricant oil sample.

At step 206 of the method 200, the one or more hardware processors 104 of the system 100 are configured to determine one or more statistical features, for each lubricant oil sample, from the corresponding simulated photoacoustic signal. A signal processing technique is used to determine the one or more statistical features for each lubricant oil sample, from the corresponding simulated photoacoustic signal. In an embodiment, the one or more statistical features for each lubricant oil sample are determined from a time-frequency signal of the corresponding simulated photoacoustic signal.

In an embodiment, the one or more statistical features are selected from a list including but are not limited to: (i) a mean of windowed kurtosis of a discrete wavelet transform (DWT) signal, (ii) a standard deviation (Std) of windowed kurtosis of the DWT, and (iii) the standard deviation (Std) of windowed mean of the DWT.

The mean of windowed kurtosis of a discrete wavelet transform (DWT) signal is calculated as follows:
Let us consider x[n] is the input signal.
Therefore, Mean $$(\mu) = \frac{1}{N}\sum_{n=0}^{N-1} y(n)$$

Now for Hanning window, $$w(n) = 0.5\left\{1 - \cos\left(2\pi\frac{n}{N}\right)\right\} \quad (14)$$

$$(0 \leq n \leq N)$$

$$w_{signal} = w(n)x(n) \quad (15)$$

wherein $w_{signal}$ is a windowed signal.
Kurtosis of that windowed signal is expressed as in equation 16:

$$k(w_{signal}) = \frac{E(w_{signal} - \mu)^4}{\sigma^4} \quad (16)$$

wherein μ=mean and σ=standard deviation.
The DWT of a signal x(n) is calculated by passing it through a series of filters, let's say p(n) is the output of DWT. Then, a convolution between the windowed signal and low-pass filter g gives $$p(n) = (w_{signal} * g)(n) = \quad (17)$$

$$\sum_{k=-\infty}^{\infty} w_{signal}(k)g(n-k) = \sum_{k=-\infty}^{\infty} \frac{E(w(k)x(k) - \mu)^4}{\sigma^4} g(n-k)$$

Then, mean of windowed kurtosis of a discrete wavelet transform (DWT) is calculated using the equation 18:

$$K1 = \frac{1}{N}\sum_{n=0}^{N-1} \sum_{k=-\infty}^{\infty} \frac{E(w(k)x(k) - \mu)^4}{\sigma^4} g(n-k) \quad (18)$$

The standard deviation (Std) of windowed kurtosis of the DWT, is calculated using the equation 19:

$$K2 = \sqrt{\frac{1}{N-1}\sum_{n=0}^{N-1}\left(\left(\sum_{k=-\infty}^{\infty} \frac{E(w(k)x(k) - \mu)^4}{\sigma^4} g(n-k)\right) - \mu\right)^2} \quad (19)$$

The standard deviation (Std) of windowed mean of the DWT, is calculated using the equation 20:

$$\sqrt{\frac{1}{N-1}\left(\left(\frac{1}{N}\sum_{n=0}^{N-1}\sum_{k=-\infty}^{\infty} x(k)g(n-k)w(n)\right) - \mu\right)^2} \quad (20)$$

At step 208 of the method 200, the one or more hardware processors 104 of the system 100 are configured to train a machine learning (ML) model with (i) the one or more statistical features for each lubricant oil sample of the plurality of lubricant oil samples determined at step 206 of the method 200, and (ii) the classification label for each of the plurality of lubricant oil samples received at step 202 of the method 200, to obtain a trained ML model.

In other words, the one or more statistical features for each lubricant oil sample of the plurality of lubricant oil samples determined at step 206 of the method 200, and (ii) the classification label for each of the plurality of lubricant oil samples are considered as the training data for training the ML model. During the training of the ML model, the one or more statistical features of each lubricant oil sample as considered as the input variables and the classification label is considered as the output variables. Thus, a relationship between the input variables (the one or more statistical features of each lubricant oil sample) and the output variable (the classification label), is learned using the training data. Once the training of the ML model with the training data is completed, the trained ML model is obtained.

In an embodiment, the ML model is one of a binary classification model or a multi-class classification model based on the nature of the classification label for each of the plurality of lubricant oil samples or the requirement of the trained ML model. If the classification label for each of the plurality of lubricant oil samples contains two classes (for example, 'contaminated', 'non-contaminated'), then the binary classification model is used. If the classification label for each of the plurality of lubricant oil samples contains more than two classes (for example, 'non-contaminated', 'contaminated with water ingress', 'contaminated with soot particle', 'contaminated with both water ingress and soot particle', and so on), then the multi-class classification model is used.

In an embodiment, the binary classification model is a classification model selected from a list of binary classification models, based on the nature of the one or more statistical features (the input variables) available. For example, the list of binary classification models includes but are not limited to a Logistic Regression model, a k-Nearest Neighbors model, Decision Trees, Support Vector Machine (SVM), and Naive Bayes.

Similarly, the multi-class classification model is a classification model selected from a list of multi-class classification models, based on the nature of the one or more statistical features (the input variables) available. For example, the list of multi-class classification models includes but are not limited to the k-Nearest Neighbors model, Decision Trees, Support Vector Machine (SVM), Random Forest model, Gradient Boosting model, and Naive Bayes.

Further, the trained ML model is validated using some part of the training data obtained at step 206 of the method 200. The validation of the trained ML model is required to finetune its model parameters. The trained ML model obtained at this step then used to classify the test oil sample, based on the classification labels using which the trained ML model is obtained. For example, if the trained ML model is the binary classification model, then such trained ML model is used to classify the test oil sample into either 'contaminated', or 'non-contaminated'. Similarly, if the trained ML model is the multi-class classification model, then such trained ML model is used to classify the test oil sample into one of the multi-class labels, for example, or 'non-contaminated', 'contaminated with water ingress', 'contaminated with soot particle', and so on.

At step 210 of the method 200, the one or more hardware processors 104 of the system 100 are configured to receive a test lubricant oil sample for which the lubricant oil condition to be monitored. Such test lubricant oil sample is associated with the machine whose health status or remaining usage of life (RUL) to be monitored or determined.

Figure 4:
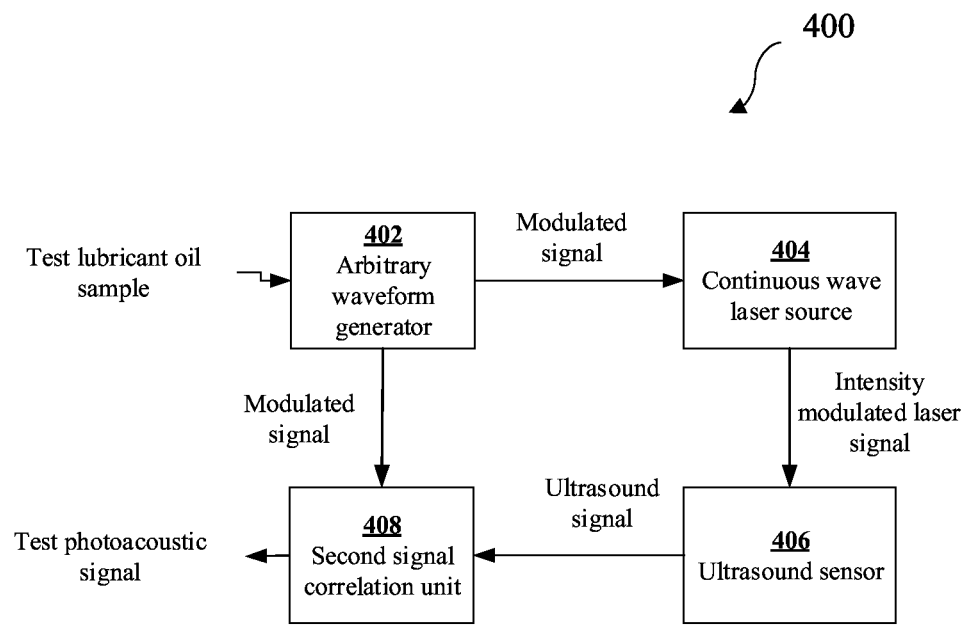
FIG. 4 is an exemplary block diagram of an experimental model, in accordance with some embodiments of the present disclosure.

At step 212 of the method 200, the one or more hardware processors 104 of the system 100 are configured to determine a test photoacoustic signal from the test lubricant oil sample received at step 210 of the method 200, using an experimental model. FIG. 4 is an exemplary block diagram of an experimental model 400, in accordance with some embodiments of the present disclosure. As shown in FIG. 4, the experimental model 400 includes an arbitrary wave generator 402, a continuous wave laser source 404, an ultrasound sensor 406, and a second signal correlation unit 408. Determining the test photoacoustic signal from the test lubricant oil sample, using the experimental model 400 is explained in detail in the below steps.

At the first step, a modulated signal for the test lubricant oil sample is obtained, using the arbitrary waveform generator 402. Then, at the second step, an intensity modulated laser signal for the corresponding lubricant oil sample, is obtained by passing the modulated signal to the continuous wave (CW) laser source 404. In an embodiment, the continuous wave laser diode having wavelength: 450 nm, maximum power: 1.6 W is used to illuminate the test lubricating oil sample. The intensity of this laser diode is modulated through the frequency sweep of 0.1 MHz to 1 MHz. The modulated power at the sample's plane is observed to be 50 mW to 450 mW.

This intensity modulated CW laser source is used to irradiate the oil sample placed in transparent container. The test lubricant oil sample used in the experiments is SAE 10W40. The test lubricant oil sample absorbs the heat from modulated laser and undergoes thermionic expansion. Subsequently, the test lubricant oil sample relaxes in a non-radiative manner thereby releasing the acoustic waves at the same frequencies to that of excitation frequency sweep.

Further, at the third step, an ultrasound signal for the test lubricant oil sample, is obtained by irradiating the intensity modulated laser signal on the corresponding test lubricant oil sample using an ultrasound sensor 406. This swept frequency acoustic wave is acquired by the ultrasound sensor which is placed in contact to the oil sample's container through the coupling gel. The ultrasound sensor converts this acoustic signal into its equivalent voltage signal which is transferred to the system 100 through a data acquisition unit.

At the fourth and last step, the test photoacoustic signal for the test lubricant oil sample, is generated by correlating the corresponding modulated signal and the corresponding ultrasound signal, through the second signal correlation unit 408. This frequency domain acoustic signal acquired is used with the Inverse Fourier Transform algorithm in MATLAB to obtain the time domain acoustic signal.

At step 214 of the method 200, the one or more hardware processors 104 of the system 100 are configured to determine the one or more statistical features of the test lubricant oil sample, from the test photoacoustic signal determined at step 212 of the method 200. The signal processing technique explained at step 206 of the method 200 is used to determine the one or more statistical features of the test lubricant oil sample. More specifically, the one or more statistical features of the test lubricant oil sample, are determined from the time-frequency signal of the test photoacoustic signal.

At step 216 of the method 200, the one or more hardware processors 104 of the system 100 are configured to pass the one or more statistical features of the test lubricant oil sample determined at step 214 of the method 200, to the trained ML model obtained at step 208 of the method 200, to obtain the classification label for the lubricant oil sample. As explained earlier, the classification label is one of the classification labels using which the trained ML model is obtained at step 208 of the method 200. For example, if the trained ML model is the binary classification model, then such trained ML model is used to classify the test oil sample into either 'contaminated', or 'non-contaminated'. Similarly, if the trained ML model is the multi-class classification model, then such trained ML model is used to classify the test oil sample into one of the multi-class labels, for example, or 'non-contaminated', 'contaminated with water ingress', 'contaminated with soot particle', and so on.

The classification label obtained at step 216 of the method 200 provides the lubricant oil condition of the test lubricant oil sample. Thus, the test lubricant oil sample is associated with the machine whose health status or remaining usage of life (RUL) to be monitored or determined, based on the classification label.

The method and systems of the present disclosure determines the condition of the lubricant oil sample, using the photoacoustic modelling which includes the photoacoustic simulation model 300 and the experimental model 400. The photoacoustic simulation model is a single non-invasive multiparametric sensing approach for determining the simulated photoacoustic signal. The simulated photoacoustic signal both the optical or photo properties and the acoustic properties and thus is used to derive effective features (training) of the corresponding lubricant oil sample. Hence the trained ML model obtained is simple and efficient for monitoring the condition of the lubricant oil and thus monitoring the corresponding machine health, performance and fault type are determined effectively.

The photoacoustic simulation model can be used as a digital twin where one copy is used to develop the machine learning model and another copy is used to monitor the condition of the lubricant oil sample using the developed machine learning model.

Example Scenario

In order to evaluate the quality of the simulated photoacoustic signal of the lubricant oil sample, obtained by the photoacoustic simulation model 300 of the present disclosure, the test photoacoustic signal of the lubricant oil sample is obtained using the experimental model as explained at step 212 of the method 200. Experiments are carried out to investigate the effect of the contaminants (soot particle and water) in the lubricant oil. 150 ml fresh oil is used. For the first investigation, the soot particles are added manually to the fresh oil in percentage weight. The soot percent by weight is added from 0% to 8% in the steps of 2%. The experiments are repeated for validating the consistency in results. In the second investigation, the water ingress contamination into the fresh oil sample is studied by preparing three sets of the sample.

Figures 5A, 5B:
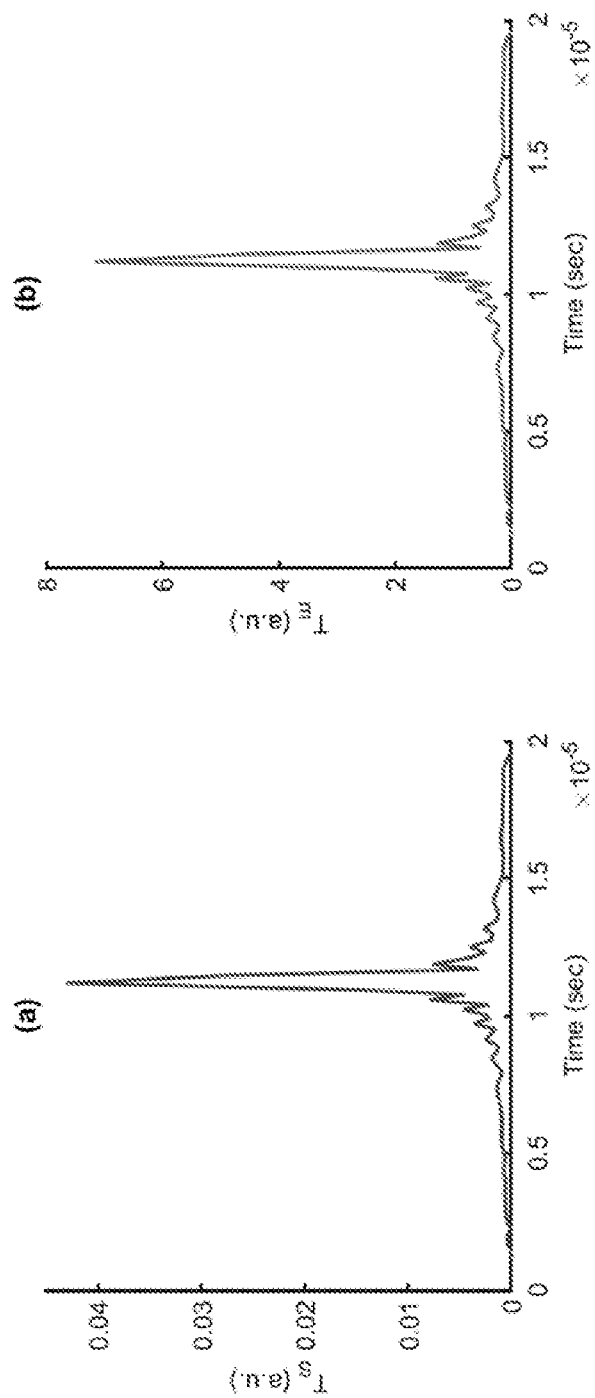
FIGS. 5A and 5B are graphs showing photoacoustic signals of a lubricant oil sample obtained by the photoacoustic simulation model and the experimental model, in accordance with some embodiments of the present disclosure.

FIGS. 5A and 5B are graphs showing a photoacoustic signals of a lubricant oil sample obtained by the photoacoustic simulation model 300 and the experimental model, in accordance with some embodiments of the present disclosure. As shown in FIGS. 5A and 5B, the graphs obtained from the photoacoustic simulation model and the experimental model are similar in shape and size. A Pearson-product cross-correlation ($\rho$) is calculated between the photoacoustic signals of the lubricant oil sample ($T_S$) obtained by the photoacoustic simulation model and the photoacoustic signals of the lubricant oil sample ($T_E$) obtained by the experimental model, using the following equation 21:

$$\rho = \frac{\text{cov}(T_S, T_E)}{\sigma_S . \sigma_E} \tag{21}$$

wherein cov is the covariance; $\sigma_S$ and $\sigma_E$ are the standard deviation of $T_S$ and $T_E$, respectively. It found in this case that $\rho=0.93$ which shows a strong positive correlation, claiming the validation of the photoacoustic simulation model of the present disclosure.

Further, the trained ML model at the step 208 of the method 200 is tested by the 10 sets of experimental data and achieved 80% of an accuracy of the trained ML model. The accuracy is calculated using the equation 22:

$$\text{Accuracy (\%)} = \left(\frac{\text{Correctly predicted samples}}{\text{Total no. of sample}}\right) \times 100 \tag{22}$$

Table 1 is a confusion matrix showing correct predictions (8 out of 10 samples). As shown in table 1, 3 true positive and 5 true negative results with only 1 false positive and 1 false negative data.

TABLE 1

|  | Predicted Contaminated | Predicted Non-contaminated |
| --- | --- | --- |
| Actual Contaminated | 3 | 1 |
| Actual Non-contaminated | 1 | 5 |

The embodiments of present disclosure herein address unresolved problem of monitoring the lubricant oil condition using the multiparametric and hybrid sensing methods called as the photoacoustic modelling which is applied to investigate the viscosity of the lubrication oil and depict the fault of the machine. Based on the experimental results, the simulated photoacoustic signal obtained by the photoacoustic simulation model of the present disclosure is very similar to the photoacoustic signal obtained by the laboratory based experimental model. Hence the present disclosure consumes less time, efficient and simple.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising the steps of:
    receiving, via one or more hardware processors, photoacoustic signals from a plurality of lubricant oil samples, and a classification label for each of the plurality of lubricant oil samples, wherein the classification label for each lubricant oil sample defines a contamination type of corresponding lubricant oil sample;
    simulating, via the one or more hardware processors, the photoacoustic signal from each lubricant oil sample, to obtain a plurality of simulated photoacoustic signals from the plurality of lubricant oil samples, using a photoacoustic simulation model, wherein the photoacoustic simulation model makes use of both one or more optical parameters and one or more acoustic parameters of the photoacoustic signal of the corresponding lubricant oil sample for simulation to obtain the corresponding simulated photoacoustic signal, wherein simulating each lubricant oil sample to obtain corresponding simulated photoacoustic signal using the photoacoustic simulation model, comprises:
        determining the one or more optical parameters, a contaminant concentration, a temperature, and the one or more acoustic parameters, for the corresponding lubricant oil sample, wherein the one or more optical parameters of the photoacoustic signal of the lubricant oil sample comprises an optical absorption coefficient $\mu_a$, a scattering coefficient $\mu_s$ and a scattering anisotropy g, wherein the one or more optical parameters of the photoacoustic signal of the corresponding lubricant oil sample are determined based on a predefined optical wavelength of the photoacoustic signal of the corresponding lubricant sample, the contaminant concentration of the lubricant oil sample is determined in the form of an effective absorption coefficient ($\mu_{a_{0eff}}$) and the one or more acoustic parameters comprises a speed of sound, a density of the lubricant oil sample and a Grüneisen parameter;
        determining a fluence for the corresponding lubricant oil sample, based on the one or more optical parameters and the contaminant concentration, using a photonic model;
        generating an initial acoustic pressure signal for the lubricant oil sample, using a finite element technique based on the one or more acoustic parameters, the contaminant concentration, the temperature, and the fluence;
        propagating the initial acoustic pressure signal to obtain a propagated acoustic pressure signal for the corresponding lubricant oil sample, using the finite element technique; and
        obtaining the simulated photoacoustic signal for the corresponding lubricant oil sample, by correlating the initial acoustic pressure signal and the propagated acoustic pressure signal;
    determining, via the one or more hardware processors, one or more statistical features, for each lubricant oil sample, from the corresponding simulated photoacoustic signal, using a signal processing technique, wherein the one or more statistical features for each lubricant oil sample are determined from a time-frequency signal of the corresponding simulated photoacoustic signal; and
    training, via the one or more hardware processors, a machine learning (ML) model with (i) the one or more statistical features for each lubricant oil sample of the plurality of lubricant oil samples and (ii) the classification label for each of the plurality of lubricant oil samples, to obtain a trained ML model;
    receiving, via the one or more hardware processors, a test photoacoustic signal from a test lubricant oil sample for which lubricant oil condition to be monitored;
    determining, via the one or more hardware processors, one or more statistical features of the test lubricant oil sample, from the test photoacoustic signal, using the signal processing technique; and
    passing, via the one or more hardware processors, the one or more statistical features of the test lubricant oil sample, to the trained ML model, to obtain classification label for the lubricant oil sample, wherein the classification label provides the lubricant oil condition of the test lubricant oil sample.

2. The processor-implemented method of claim 1, wherein determining the test photoacoustic signal from the test lubricant oil sample, using the experimental model, comprising:
    obtaining a modulated signal for the test lubricant oil sample, using an arbitrary waveform generator;
    obtaining an intensity modulated laser signal for the test lubricant oil sample, by passing the modulated signal to a continuous wave laser source;
    obtaining an ultrasound signal for the test lubricant oil sample, by irradiating the intensity modulated laser signal on the test lubricant oil sample using an ultrasound sensor; and
    obtaining the test photoacoustic signal for the test lubricant oil sample, by correlating the modulated signal and the ultrasound signal.

3. The processor-implemented method of claim 1, wherein the one or more statistical features of the test lubricant oil sample, are determined from a time-frequency signal of the test photoacoustic signal.

4. The processor implemented claim 1, wherein the photoacoustic simulation model is used as a digital twin, wherein one copy of the photoacoustic simulation model is used to develop a machine learning model and another copy of the photoacoustic simulation model is used to monitor condition of each lubricant oil sample using the trained ML model.

5. The processor implemented claim 1, wherein the trained ML model is used for monitoring the condition of the lubricant oil and thus monitoring corresponding health and performance of a machine and determining a fault type of the machine.

6. A system comprising:
    a memory storing instructions;
    one or more input/output (I/O) interfaces; and one or more hardware processors coupled to the memory via the one or more I/O interfaces, wherein the one or more hardware processors are configured by the instructions to:

receive photoacoustic signals from a plurality of lubricant oil samples, and a classification label for each of the plurality of lubricant oil samples;

simulate photoacoustic signal from each lubricant oil sample, to obtain a plurality of simulated photoacoustic signals from the plurality of lubricant oil samples, using a photoacoustic simulation model, wherein the one or more hardware processors are configured by the instructions to simulate the photoacoustic signal from each lubricant oil sample to obtain corresponding simulated photoacoustic signal using the photoacoustic simulation model by:

determining one or more optical parameters, a contaminant concentration, a temperature, and one or more acoustic parameters, for the corresponding lubricant oil sample, wherein the one or more optical parameters of the lubricant oil sample comprises an optical absorption coefficient $\mu_a$, a scattering coefficient $\mu_s$ and a scattering anisotropy g, wherein the one or more optical parameters of the lubricant oil sample are determined based on a predefined optical wavelength of the photoacoustic signal of the corresponding lubricant sample, the contaminant concentration of the lubricant oil sample is determined in the form of an effective absorption coefficient ($\mu_{a_{0eff}}$) and the one or more acoustic parameters comprises a speed of sound, a density of the lubricant oil sample and a Grüneisen parameter;

determining a fluence for the corresponding lubricant oil sample, based on the one or more optical parameters and the contaminant concentration, using a photonic model;

generating an initial acoustic pressure signal for the lubricant oil sample, using a finite element technique based on the one or more acoustic parameters, the contaminant concentration, the temperature, and the fluence;

propagating the initial acoustic pressure signal to obtain a propagated acoustic pressure signal for the corresponding lubricant oil sample, using the finite element technique; and obtaining the simulated photoacoustic signal for the corresponding lubricant oil sample, by correlating the initial acoustic pressure signal and the propagated acoustic pressure signal;

determine one or more statistical features, for each lubricant oil sample, from the corresponding simulated photoacoustic signal, using a signal processing technique, wherein the one or more hardware processors are configured by the instructions to determine the one or more statistical features for each lubricant oil sample from a time-frequency signal of the corresponding simulated photoacoustic signal; and train a machine learning (ML) model with (i) the one or more statistical features for each lubricant oil sample of the plurality of lubricant oil samples and (ii) the classification label for each of the plurality of lubricant oil samples, to obtain a trained ML model;

receive a test photoacoustic signal from a test lubricant oil sample for which lubricant oil condition to be monitored;

determine one or more statistical features of the test lubricant oil sample, from the test photoacoustic signal, using signal processing technique; and pass the one or more statistical features of the test lubricant oil sample, to the trained ML model, to obtain the classification label for the lubricant oil sample, wherein the classification label provides the lubricant oil condition of the test lubricant oil sample.

7. The system of claim 6, wherein the one or more hardware processors are configured by the instructions to determine the test photoacoustic signal from the test lubricant oil sample, using a experimental model, by:

obtaining a modulated signal for the test lubricant oil sample, using an arbitrary waveform generator;

obtaining an intensity modulated laser signal for the test lubricant oil sample, by passing the modulated signal to a continuous wave laser source;

obtaining an ultrasound signal for the test lubricant oil sample, by irradiating the intensity modulated laser signal on the test lubricant oil sample using an ultrasound sensor; and obtaining the test photoacoustic signal for the test lubricant oil sample, by correlating the modulated signal and the ultrasound signal.

8. The system of claim 6, wherein the one or more hardware processors are configured by the instructions to determine the one or more statistical features of the test lubricant oil sample, from a time-frequency signal of the test photoacoustic signal.

9. One or more non-transitory machine-readable information storage mediums comprising one or more instructions which when executed by one or more hardware processors cause:

receiving, photoacoustic signals from a plurality of lubricant oil samples, and a classification label for each of the plurality of lubricant oil samples, wherein the classification label for each lubricant oil sample defines a contamination type of corresponding lubricant oil sample;

simulating, the photoacoustic signal from each lubricant oil sample, to obtain a plurality of simulated photoacoustic signals from the plurality of lubricant oil samples, using a photoacoustic simulation model, wherein the photoacoustic simulation model makes use of both one or more optical parameters and one or more acoustic parameters of the photoacoustic signals of the corresponding lubricant oil sample for simulation to obtain the corresponding simulated photoacoustic signals, wherein simulating each lubricant oil sample to obtain corresponding simulated photoacoustic signal using the photoacoustic simulation model, comprises:

determining the one or more optical parameters, a contaminant concentration, a temperature, and the one or more acoustic parameters, for the corresponding lubricant oil sample, wherein the one or more optical parameters of the lubricant oil sample comprises an optical absorption coefficient $\mu_a$, a scattering coefficient $\mu_s$ and a scattering anisotropy g, wherein the one or more optical parameters of the lubricant oil sample are determined based on a predefined optical wavelength of the photoacoustic signal of the corresponding lubricant sample, the contaminant concentration of the lubricant oil sample is determined in the form of an effective absorption coefficient ($\mu_{a_{0eff}}$) and the one or more acoustic parameters comprises a speed of sound, a density of the lubricant oil sample and a Grüneisen parameter;

determining a fluence for the corresponding lubricant oil sample, based on the one or more optical parameters and the contaminant concentration, using a photonic model;

generating an initial acoustic pressure signal for the lubricant oil sample, using a finite element technique based on the one or more acoustic parameters, the contaminant concentration, the temperature, and the fluence;

propagating the initial acoustic pressure signal to obtain a propagated acoustic pressure signal for the corresponding lubricant oil sample, using the finite element technique; and obtaining the simulated photoacoustic signal for the corresponding lubricant oil sample, by correlating the initial acoustic pressure signal and the propagated acoustic pressure signal;

determining, one or more statistical features, for each lubricant oil sample, from the corresponding simulated photoacoustic signal, using a signal processing technique, wherein the one or more statistical features for each lubricant oil sample are determined from a time-frequency signal of the corresponding simulated photoacoustic signal; and training, a machine learning (ML) model with (i) the one or more statistical features for each lubricant oil sample of the plurality of lubricant oil samples and (ii) the classification label for each of the plurality of lubricant oil samples, to obtain a trained ML model;

receiving, via the one or more hardware processors, a test photoacoustic signal from a test lubricant oil sample for which lubricant oil condition to be monitored;

determining, via the one or more hardware processors, one or more statistical features of the test lubricant oil sample, from the test photoacoustic signal, using the signal processing technique; and passing, via the one or more hardware processors, the one or more statistical features of the test lubricant oil sample, to the trained ML model, to obtain the classification label for the lubricant oil sample, wherein the classification label provides the lubricant oil condition of the test lubricant oil sample.

* * * * *